F. G. SLEMMER.
Clothes-Line Hook.
No. 222,086. Patented Nov. 25, 1879.
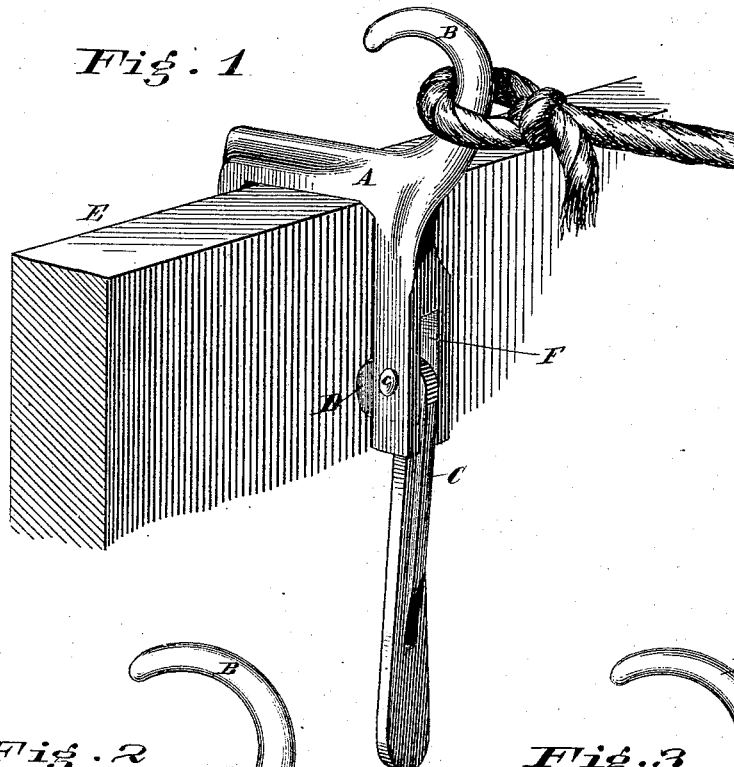
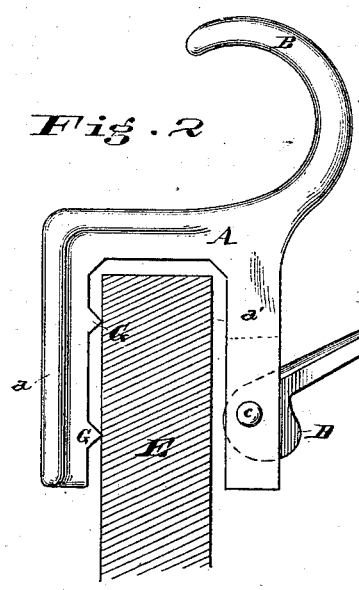
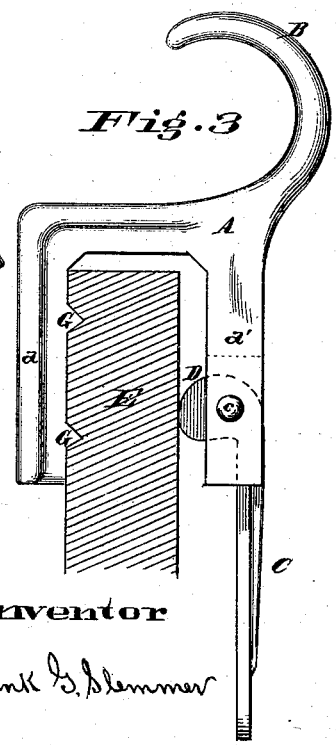
Attests
Thos. Smith
George H. Rabe
Inventor
Frank G. Slemmer

UNITED STATES PATENT OFFICE.

FRANK G. SLEMMER, OF PHILADELPHIA, PENNSYLVANIA.

IMPROVEMENT IN CLOTHES-LINE HOOKS.

Specification forming part of Letters Patent No. 222,086, dated November 25, 1879; application filed April 26, 1879.

*To all whom it may concern:*

Be it known that I, FRANK G. SLEMMER, of the city and county of Philadelphia, State of Pennsylvania, have invented a new and useful Improvement in Clothes-Line Hooks, which improvement is fully set forth in the following specification, reference being had to the accompanying drawings.

The object of my invention is to provide a hook, of iron or any other suitable material, for clothes-lines that may be attached to or detached from the fence at will, and moved from place to place quickly and with ease, in order to facilitate the putting up and taking down clothes-lines or shifting of the same.

Figure 1 is a perspective view of my improvement in clothes-line hooks, and Figs. 2 and 3 side elevations of the same.

A B is the hook, provided with arms $a$ $a'$, sufficiently far apart to enable them to slip loosely over the top of board fence E. G G are small nubs or projections on one of the arms, the opposite one being provided with a slot, F, in which fits an eccentric, D, with handle C, and held in place and moving on pin or bolt $c$.

In attaching the hook to the fence the handle C is raised, Fig. 2, and the arms $a$ $a'$ slipped over the fence E, when the handle is pressed down, Fig. 3, forcing the eccentric D against the board and drawing the points G G into the same on opposite side, thus clamping it firmly and securely.

I claim as my invention—

The hook A B, provided with arms $a$ $a'$, slot F, eccentric D, and handle C, substantially as shown and described.

FRANK G. SLEMMER.

Witnesses:
GEORGE F. BABE,
ISAIAH ALDRICH.